US010806098B2

(12) United States Patent
Gustafik

(10) Patent No.: US 10,806,098 B2
(45) Date of Patent: Oct. 20, 2020

(54) CANNABIS GROWTH METHODS AND SYSTEMS

(71) Applicant: CLOSED S, LLC, West Linn, OR (US)

(72) Inventor: Daniel Gustafik, West Linn, OR (US)

(73) Assignee: CLOSED S, LLC, West Linn, OR (US)

( * ) Notice: Subject to any disclaimer, the term of this patent is extended or adjusted under 35 U.S.C. 154(b) by 86 days.

(21) Appl. No.: 16/036,798

(22) Filed: Jul. 16, 2018

(65) Prior Publication Data

US 2018/0317401 A1    Nov. 8, 2018

Related U.S. Application Data

(63) Continuation of application No. 14/861,979, filed on Sep. 22, 2015, now Pat. No. 10,021,838.

(60) Provisional application No. 62/053,685, filed on Sep. 22, 2014.

(51) Int. Cl.
    *A01G 9/24*      (2006.01)
    *G05B 15/02*     (2006.01)

(52) U.S. Cl.
    CPC ............... *A01G 9/24* (2013.01); *G05B 15/02* (2013.01)

(58) Field of Classification Search
    CPC .................................. A01G 9/24; G05B 15/02
    See application file for complete search history.

(56) References Cited

U.S. PATENT DOCUMENTS

| 3,905,153 A | 9/1975 | Enter |
| 4,291,674 A | 9/1981 | Comte et al. |
| 4,313,650 A | 2/1982 | Ward et al. |
| 4,352,256 A | 10/1982 | Kranz et al. |
| 4,396,872 A | 8/1983 | Nutter et al. |
| 4,470,405 A | 9/1984 | Landstrom et al. |
| 4,569,150 A | 2/1986 | Carlson et al. |
| 4,817,332 A | 4/1989 | Ikeda et al. |
| 5,524,381 A | 6/1996 | Chahroudi et al. |
| 5,585,418 A | 12/1996 | Nagata et al. |
| 5,818,734 A | 10/1998 | Albright et al. |
| 7,111,952 B2 | 9/2006 | Veskovic et al. |
| 7,488,137 B2 | 2/2009 | Hu et al. |
| 7,502,655 B2 | 3/2009 | Albright et al. |
| 7,987,632 B2 | 8/2011 | May et al. |
| 8,061,080 B2 | 11/2011 | Loebl et al. |

(Continued)

FOREIGN PATENT DOCUMENTS

| DE | 3614387 | 10/1987 |
| JP | 223818 | 1/1990 |

(Continued)

OTHER PUBLICATIONS

Non-Final Rejection dated Sep. 22, 2017, U.S. Appl. No. 14/861,979, filed Sep. 22, 2015.

*Primary Examiner* — Yuhui R Pan
(74) *Attorney, Agent, or Firm* — Lane Powell PC

(57) ABSTRACT

*Cannabis* growth systems can have one or more sensors that sense various environmental elements in the ambient environment in which *cannabis* plants are growing. The sensors are electrically connected to a central controller that receives the sensed data relating to the environmental elements and can take various actions in response to the sensed data like adjusting one or more of the environmental control systems that control different environmental elements in the ambient environment.

17 Claims, 5 Drawing Sheets

(56) References Cited

U.S. PATENT DOCUMENTS

| | | | |
|---|---|---|---|
| 2009/0272029 A1* | 11/2009 | Aiking | A01N 3/00 47/1.43 |
| 2012/0124902 A1 | 5/2012 | Moon et al. | |
| 2013/0006401 A1* | 1/2013 | Shan | H04L 67/125 700/90 |
| 2013/0093592 A1* | 4/2013 | Lan | A01G 9/24 340/602 |
| 2015/0230409 A1* | 8/2015 | Nicole | A01G 7/045 47/17 |

FOREIGN PATENT DOCUMENTS

| | | |
|---|---|---|
| JP | 2011045317 | 3/2011 |
| WO | WO2007/071722 | 6/2007 |

\* cited by examiner

CANNABIS GROWTH METHODS AND SYSTEMS

CROSS-REFERENCE TO RELATED APPLICATION

This application is a continuation of U.S. application Ser. No. 14/861,979, filed Sep. 22, 2015, which claims benefit of U.S. Provisional Application No. 62/053,685, filed Sep. 22, 2014, which is hereby incorporated by reference in its entirety.

BACKGROUND OF THE INVENTION

Cannabis is a genus in the family cannabaceae (also known as the hemp family), and the division Manoliophyta (the flowering plants). Cannabis has unique pharmacological properties due to the presence of cannabinoids, a group of more than 100 natural products that mainly accumulate in female flowers. $\Delta^9$-Tetrahydrocannabinol ("THC") is the principle psychoactive cannabinoid and the compound responsible for the analgesic, antiemetic and appetite-stimulating effects of cannabis. Cannabinoid content and composition is highly variable among cannabis plants. Selective breeding of cannabis and improved cultivation practices have led to increased potency in the past several decades. This breeding effort has produced hundreds of strains that differ in cannabinoid composition, as well as appearance and growth characteristics.

Recently, the increased medical and recreational legal use of cannabis has led to a demand for improved cultivation and breeding practices thereby improving the quality and quantity of cannabis available on the marketplace. The widespread medical use and the increasingly popular recreational use have caused cannabis supply shortages.

Current cannabis growth methods require cultivators to set up permanent and complex facilities to properly grow cannabis. Such facilities have limited capabilities, including requiring the installation of many types of equipment and consuming large amounts of energy. For example, a grow facility typically requires a large tract of land to accommodate the large number of plants required to obtain the desired amount of cannabis production. The known cannabis growth methods typically face challenges like fungal infestation, difficulty in controlling the climate in the plants' environment, the requirement of high levels of power consumption to power the necessary environmental controls, and the high level of detailed human interaction required to cultivate and nurture the cannabis plants throughout the grow cycle.

More generally, the current cannabis grow systems are expensive to maintain because of the extensive systems, both technological and human, that are required for a successful grow cycle. As a result, the current grow facilities have space restrictions and grow cycle limitations. Further, the current grow facilities must have experienced cultivators that continually monitor and intervene in all aspects of the cannabis plants' growth cycle, beginning from managing the plants' environment for optimal growth, such as $CO_2$ levels, temperature, humidity, etc. to the plants' cultivation and processing.

Therefore, the art would benefit from less expensive cannabis growth methods and systems that are able to produce higher growth rates, improved plant quality, reduction in fungal infections and other plant pests, produce multiple grow cycles within an optimal, controlled environment.

SUMMARY OF THE INVENTION

Cannabis growth systems and methods can include a controller that is configured to receive one or more sensed values from one or more respective environmental sensors that each sense various environmental elements of an ambient environment in which cannabis plant(s) are growing. The controller compares the received sensed values to ideal values or ranges of ideal values that are associated with the sensed respective environmental elements. The ideal values and ranges of ideal values are associated with ideal or near ideal cannabis plant growth for the cannabis plants. The controller also determines instructions for adjusting the respective environmental control system that are based at least in part on the comparison of the sensed values to the ideal or near ideal values. The controller also generates a data message that includes the determined instructions and the data messages are sent over dedicated electrical connections coupled to environmental control systems that each control respective environmental elements in the ambient environment.

DETAILED DESCRIPTION

The disclosed cannabis growth systems and methods provide a new, highly operationally-efficient, cost-efficient, and user-friendly manner in which to grow cannabis plants. The disclosed systems and methods reduce overall power consumption and improve overall production. The disclosed systems and methods also precisely control the ambient environment of the cannabis plants and thus improve the overall product itself.

Figure 1:
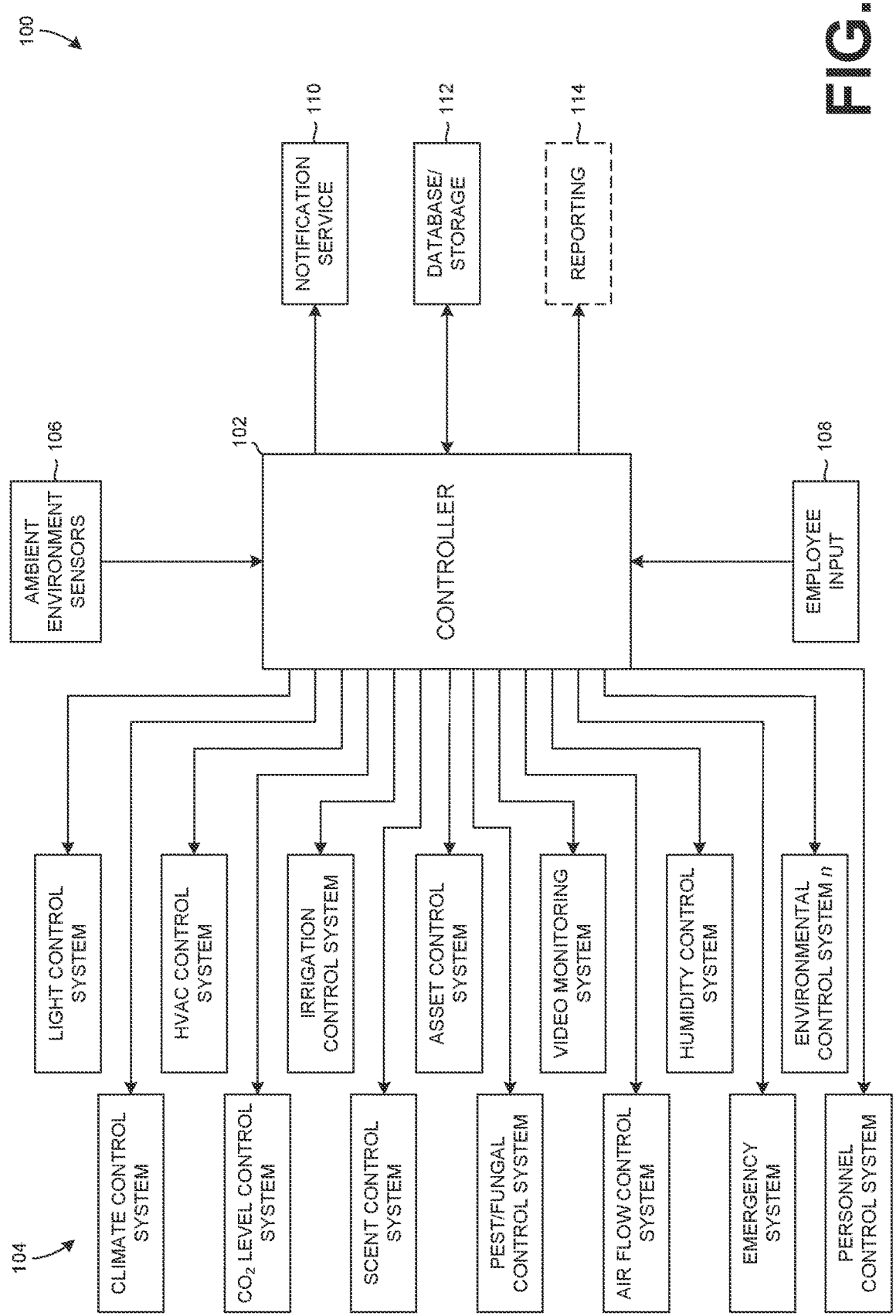
FIG. 1 is an example cannabis growth system according to an embodiment of the invention.

An example cannabis growth system 100 is shown in FIG. 1. The controller 102 is connected and communicates with a plurality of control systems 104, ambient environment sensors 106, employee input portals 108, a notification service 110, a database and information repository 112 and an optional reporting output 114. The controller 102 receives inputs from the ambient environment sensors 106 and compares the received sensor 106 values to a stored, or inputted, set of ideal values and/or ranges 112 for various ambient environment conditions. The controller 102 can output commands to various control systems 104 to correct discrepancies between sensed ambient environmental values and stored, or inputted, ideal values and/or ranges.

The multiple control systems 104 can includes the various control systems shown in FIG. 1, which includes control systems that are each configured to monitor and control their respective environmental element within the ambient environment. For example, the system show in FIG. 1 has multiple control systems that are each configured to monitor and control the light, climate, heating ventilation and air conditioning (HVAC), CO2 levels, irrigation, scent, assets (i.e., the plants and the equipment), pest/fungal levels, video monitoring/surveillance, air flow, humidity, emergency/security, asset, personnel, and any other control systems that may be needed or desired. Any combination of the control systems illustrated in FIG. 1 could be included in alternative embodiments and additions of other control systems could also be made. The number and type of control systems included in the disclosed *cannabis* growth methods and systems can be set by the controller and/or could be customized to the end-users needs or customizable, in whole or in part, by the end user.

The controller 102 can also receive employee input 108, informing the controller 102 actions that have been taken by employees, or workers, as the actions can affect the controller's 102 commands to the control systems 104. Additionally, the controller 102 can write received data from the ambient environment sensors 106 and employee input 108 to a database 112. The information stored within the database 112 can be retrieved by the controller 102 to prepare commands to the control systems 104. Further, the controller 102 can send alerts or notifications to users or others through a notification service 110. Such notifications can include alerts regarding system status, emergencies, sensed ambient environment values and other system information. Optionally, the controller 102 can be configured to report system information, which can include control system 104, sensors 106, and employee 108 status and information, to a report module 114 which can be accessed to allow a user or others an overview of the growth system 100 and performance of the system.

The disclosed *cannabis* growth systems and methods provide at least a partially sealed ambient environment, and in some examples a fully sealed ambient environment, for growing *cannabis*. Within the ambient environment, the *cannabis* plant(s) are exposed to optimum natural and optimum artificial light levels for various periods of time to create a hybrid *cannabis* growth model of the combined types of light. Natural light is supplemented with artificial light in a calculated, and an optionally customized, manner to achieve the optimum light levels for growing *cannabis* plants. A sealed ambient environment for the plants provides complete climate control and shelters the plants from outside elements, weather, pests, and other hazards to obtain indoor quality *cannabis* growth with a hybrid natural light and artificial light grow facility model.

In some example, the *cannabis* plants are exposed to a combination of natural and artificial light for an optimum natural light period of time and an artificial light period of time. The optimum natural light period of time exposes the *cannabis* plants to natural light, like sunlight. The optimum artificial light period of time exposes the *cannabis* plants to artificial lights that encourage *cannabis* plant growth. The optimum artificial light and the optimum natural light together form the overall ideal light to which the *cannabis* plants should be exposed for ideal growth conditions. Ideal light for *cannabis* growth is known or can be analyzed. Various characteristics of the ideal light can be quantified, such as the length of light exposure, the intensity, and the spectrum.

To determine the total light exposure for the *cannabis* plants in one example including both the natural and artificial light, the ideal light's intensity and spectrum and other characteristics are determined and then compared to the geographic region where the plants are located. The light available where the plants are located is analyzed and the values for the same characteristics of the ideal light are obtained. The difference between the ideal light characteristics and the characteristics of the light at the location of the plants is calculated to determine how to supplement the naturally available light with the artificial lights at the location of the plants with a hybrid light exposure.

The hybrid light exposure with the optimum natural light and optimum artificial light periods of time can be determined in several ways. In one example, the optimum natural light and the optimum artificial light periods of time are calculated by determining ideal *cannabis* plant grow conditions for a particular geographic region that is well-suited to growing *cannabis* plants. Further, the specific time of year with the optimum amount of natural light can be determined for the geographic region. The amount of natural light best suited for the *cannabis* plant growth can be supplemented with a calculated amount of artificial light, which can be the optimum artificial light period of time. By exposing the *cannabis* plants to the calculated combination of optimum natural light and optimum artificial light, the hybrid light exposure, *cannabis* plants grow very well and produce bigger product in short periods of time compared to traditional grow methods and systems.

In addition to exposing the *cannabis* plants to light, both natural and artificial, the *cannabis* plants are also deprived of both natural and artificial light for a light deprivation period of time. Similar to calculating the optimum natural and artificial light periods of time, the light deprivation period of time can be determined to be an ideal value as well. *Cannabis* plants need a period of time during a 24-hour period during which the plants are completely or almost completely deprived of light. The light deprivation period of time promotes the *cannabis* plant growth in ideal or near ideal growing conditions. Combined with the light deprivation period of time during the 24-hour period, the hybrid light exposure with the optimum natural light and the optimum artificial light periods of time provide the *cannabis* plants with ideal or near ideal overall light exposure and light deprivation.

Light deprivation techniques vary and any known or developed light deprivation technique can be incorporated into the disclosed systems and methods. One simple light deprivation technique involves placing a dark-colored fabric over the plants. Other light deprivation techniques include suspended particle technologies or any other technology in which a voltage is applied or removed or a substance or surface to cause the substance or surface to darken. The process is typically reversible and the substance or surface can be made to darken and become transparent at the user's command. The controller can be programmed to lighten and darken the substance or surface according to a predetermined schedule, which could be determine by the selected growth cycle, in some examples. Another light deprivation technique includes running a liquid suspension between any translucent material(s) to block the light. Any of these light deprivation techniques can be used, individually or together in combination.

The controller, in this example, automatically darkens the surface according to a schedule guided by a clock or other triggering event. The clock can be an atomic clock, in some examples, and can regulate the timing of any one or more events that occur throughout the disclosed *cannabis* growth methods and systems. The triggering events can be an action that needs to be taken according to a schedule or in response to a received or sensed data, like turning on/off the artificial lighting system, causing the plants to become exposed to the natural light, regulating the climate of the ambient environment of the plants, and any other system that can be regulated.

Another aspect of the disclosed *cannabis* growth methods and systems includes sensing one or more values of the ambient environment of the *cannabis* plant(s) throughout the 24-period or any time during the grow cycle. The sensed values of the ambient environment can be taken at regular intervals, during maintenance or repair of a system component, or on-demand by a user. Any element of the *cannabis* plant's ambient environment can be sensed by the methods and systems.

The sensed environmental elements can be adjusted by the controller if the sensed values are not acceptable. The controller can take any number of actions in response to a sensed value, such as sending an alert, prompting for user input, generating instructions to one or more control systems to adjust one or more environmental elements, and the like. The controller can generate instructions to adjust an environmental control system based on a sensed value being determined to be outside of an ideal range of values for that environmental element, for example. The controller could automatically send the instructions to the affected control system or could prompt a user for approval or review of the instructions before the instruction is sent to the control system to be adjusted.

In an example, the temperature of the environment is sensed and the sensed temperature is compared to a predetermined, acceptable range of temperatures for the ambient environment. If the sensed temperature, or other sensed element, falls outside of the predetermined range, the environmental element can be adjusted to bring it within the predetermined range. For the temperature example, temperature can be adjusted cooler or warmer until the temperature of the environment of the *cannabis* plant is within the acceptable range. Alternatively, the controller can determine that an adjust should be made to the sensed temperature or other environmental elements even if the sensed value is within the ideal range of values for that environmental elements. In this alternative example, some environmental elements may be interrelated and adjusting one value that appears to be in an ideal range may favorably adjust another environmental element to help bring that other environmental element into an ideal range of values.

The ability of the controller to precisely adjust each environmental control system provides the disclosed methods and systems with universal control over the ambient environment of the *cannabis* plants. Each environmental element can be precisely adjusted to ideal values to create an ambient environment in which all environmental elements are ideal. Oftentimes, even in the most favorable natural environments for *cannabis* plant growth, nature cannot provide the ideal ambient environment across all environmental elements nor can it provide the level of precision that a fully-monitored and controllable ambient system can provide. The control and precision provided by the disclosed methods and systems provide a more favorable environment for growing *cannabis* plants than can exist in nature.

The acceptable or predetermined ranges or values for the sensed environmental elements are typically those ranges or values that promote ideal or near ideal *cannabis* plant growth or at a minimum, they do not harm the *cannabis* plants during their growth process. The acceptable or predetermined ranges can be based on respective conditions for an ideal environment for growing *cannabis* plants. Conditions can include temperatures, humidity levels, carbon dioxide ($CO_2$) exposure levels, soil conditions, plant water levels, fungal or other pest exposure, or the like. Multiple environmental elements can be sensed and precisely adjusted in the ambient environment of the *cannabis* plants.

The plants in their ambient environment for the examples above could be physically located in the region in which the *cannabis* plant ideally grows or the plants in their ambient environment could be located elsewhere. The ambient environment, wherever it is physically located, emulates the ideal growing conditions for the *cannabis* plants at the ideal time of year and/or any other ideal or suitable conditions for growing the plants. Typically, conventional *cannabis* grow facilities consume a very high amount of power, which is expensive, and produce relatively low yields on the plants. The disclosed *cannabis* growth methods and systems expose the plants to ideal growing conditions to increase the number of possible grow cycles for the plant, which increases production and improves profits.

Further, by harvesting the natural light available in the ambient environment of the *cannabis* plants, the disclosed systems and methods can reduce the overall power consumption of the grow process, which reduces operating costs and improves profits. The optimum natural light exposure using the hybrid light exposure approach reduces the amount of time that the *cannabis* plants are required to be exposed to the artificial lights, which in turn reduces the amount of power required for the growth process. Many other great benefits are realized by the new *cannabis* growth methods and systems.

Accordingly, the disclosed *cannabis* growth systems provide a controller programmed to receive a sensed value of at least one of a plurality of environmental elements in an indoor *cannabis* grow facility. The multiple environmental elements can be customized to a selected growth process for the plants. The selected growth process can be automatically selected by the controller based on plant type, plant strain, target cannabinoids, and any other factors, and/or can be selected by a user or otherwise manually for any grow factor. The growth process is the manner in which the plants are scheduled to be grown and includes details on the light exposure, the light deprivation, the light intensity, the light spectrum, the level of humidity, the temperature, and any other environmental factor impacting the manner in which the *cannabis* plants grow.

The controller determines if the sensed value is within a range of ideal values for at least one of the plurality of environmental elements by comparing the sensed values to known, compiled, or input ideal values. Once the comparison has been made, the controller then determines whether one or more of the control systems needs adjustment based at least in part on the results of the comparison of the sensed values to the ideal values. In some examples, the controller bases its determination on whether to adjust one or more control systems based entirely on the comparison of the sensed value(s) to the ideal values. In other examples, the controller relies on other information, either internal or received from an external source or other computing system, in addition to the results of the comparison of the sensed value(s) to the ideal values.

The controller sends a data message that includes instructions for at least one remote environmental control system to adjust the at least one of the plurality of environmental elements to a value within the predetermined range of values. The controller of the disclosed *cannabis* growth systems can further have multiple dedicated electrical connections that are each electrically connected to one or more environmental control systems that respectively control each of the environmental elements. Each of the dedicated electrical connections is configured to send the data messages to control one or more of the environmental control systems. The dedicated electrical connections can be physically attached to the controller by a cable or other direct physical connection, in some examples, or can be wirelessly connected to the controller or otherwise.

The ambient environment can be any suitable environment and, as discussed above, it can be partially or entirely sealed. A sealed environment is one whose interior environment does not have contact with its exterior surroundings. Sealed environments can protect the plants inside by preventing exposure to potentially harmful pests, contaminants, and the like and to provide an ideal ambient growing environment for the plants. A partially sealed environment permits the plants located in the ambient, interior environment to have some exposure to its exterior environment, such as by a door or other barrier that can be selectively opened or removed to permit exposure of the plants to the exterior environment both by physically moving the plants to the exterior environment by any suitable method or by permitting the plants to be exposed to the exterior environment without moving, such as opening a window, door, or other barrier between the interior, ambient environment and the exterior environment.

In an example, the ambient environment is located in a structure, like a building. The building could be a new building or could be an existing building or other structure that is retrofitted to accommodate the ambient environment for the *cannabis* plants. The structures that house the ambient environment for the *cannabis* plants can include various systems that control the environmental elements, such as providing a heating ventilation and air conditioning (HVAC) system to regulate temperature in the ambient environment. Common HVAC systems that can be used include central-type systems, split systems, geothermal systems, thermal batteries, liquid to liquid cooling, chillers with and without cooling towers, general evaporative cooling and other conventional systems. The HVAC systems can be filtered, for example, though HEPA and other types of filters like Merv8 and activated charcoal filters with ultraviolet (UV) lights or other method of air filtration. Additional systems to control other environmental elements are discussed more below.

In some example systems, like the structures described above, the structure needs to be able to expose the *cannabis* plants to both natural light and artificial light for the optimum periods of time. The systems, in the structure example, can expose the plants to natural light in many ways, including by providing a selectively transparent surface that, when made to be transparent to expose the plants to the natural light available outside of the structure and, when the surface is darkened, the plants are deprived of natural light almost or completely entirely. The disclosed systems and method for *cannabis* growth harvest the most ideal natural light available at any given time and location and supplement the natural light, if necessary, with artificial light to achieve ideal light exposure for the *cannabis* plants throughout the grow cycle.

Figure 2:
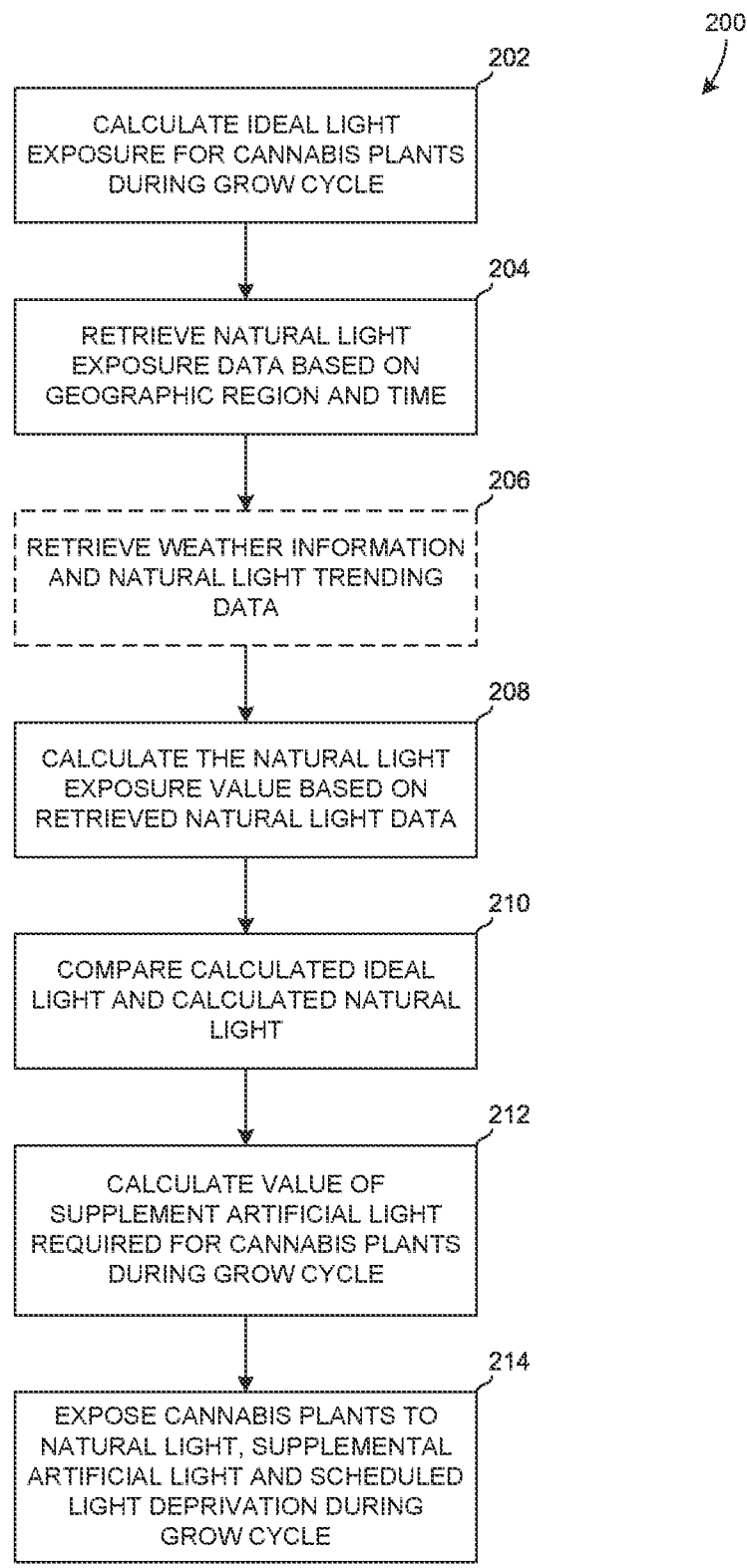
FIG. 2 is an example control system adjustment method according to an embodiment of the invention.

FIG. 2 is an example light control system method 200 according to an embodiment of the invention. Ideal light exposure for the *cannabis* plants is calculated 202. This calculation 202 can consider numerous aspects of *cannabis* growth, including strain and economic considerations, including an accelerated growth cycle and cannabinoid maximization among other considerations. Natural light data for the geographical region and time/season is retrieved 204. The retrieved data is a measure of the amount of natural light exposure expected for the grow facility area based on the time of year. Optionally, the system can retrieve weather forecasting information and track or receive data regarding natural light trends 206. Such data allows the method to consider adjustments to the expected natural light exposure data 204 based on actual and future natural light exposure data. An expected, or actual, natural light exposure value 208 can be calculated based on the retrieved information 204 and 206. The calculated natural light exposure value 208 is compared 210 to the calculated ideal light exposure 202.

A value of supplemental artificial light can then be calculated 212. The calculated supplemental artificial light value 212 accounts for the difference in light exposure from the ideal and the available natural light and together with the natural light become the hybrid light exposure. In this manner, the artificial lights are used for a minimal amount, which conserves energy and minimizes economic costs of the growth operation. Once the supplemental artificial light value is calculated 212, the *cannabis* plants can be exposed to the combination of natural and supplemental artificial light and received scheduled light deprivation during the grow cycle 214. Further, the calculation between the natural light and ideal light can consider the exposed light spectrum and intensity, allowing the supplemental artificial light to account for not only light amount differences, but also differences in the available light spectrum and intensity. The consideration of light quality and quantity allow the method 200 to provide the optimal light for *cannabis* growth while reducing the associated costs of artificial light generation.

Another option for natural light exposure is to provide a transparent surface and an opaque movable surface, like a door, window, or other moveable barrier that can open and close, so that the plants can be exposed to the natural light during the optimum natural light period of time when the door, for example, is open and can either be exposed to the artificial light or can be light deprived when the door is closed.

Some example systems and methods expose the plants to both natural light and artificial light for some period of overlapping time. In an example embodiment, the opaque surface can be retracted or moved to expose the plants to the light and moved again to obscure the natural light and deprive the plants of the light. Oftentimes, growers wish to expose the plants to 12 hours of light and 12 hours of darkness in a 24-hour period of time. The natural light in any given geographic region does not typically last for 12 hours in a 24-hour period of time, which requires the hybrid light exposure approach of supplementing the natural light with artificial light to reach the ideal 12 hours of light exposure for the plants. By maximizing the natural light harvest, the overall power consumption for the disclosed systems and methods is significantly reduced over traditional grow methods and systems.

Additionally, the *cannabis* plants can be exposed to natural light by physically moving the plants outside of the structure in the structure example discussed above. For example, the structure is a building and the plants are moved outside of the building to expose the plants to natural light. The plants in this example are removed from the sealed environment in the building to a place outside of the building. Such a system is considered a partially sealed ambient environment for the plants.

The plants can be moved in and out of the building, or other structure, by suitable means. A person can physically move the plants or a roller system of some kind can be used to physically move the *cannabis* plants outside of the building. For example, the plants can be positioned on a railcar, or cart, that can be rolled in and out of the building, manually or automatically, at the desired times to expose the plants to the optimum level of natural light for their growth process. The railcars could, in some examples, be able to move many plants at a scheduled or otherwise predetermined time. Another example system can be a conveyor-belt configuration in which a sealed portion of the conveyor belt can position the plants within the sealed environment for artificial light exposure and light deprivation and an outside portion of the conveyor belt that can transport the plants from the sealed environment in the building to a position on the conveyor belt outside of the building. The conveyor belt example could also be configured to be reversible, so that the plants could be moved from the outside of the building back to the sealed environment at the desired time. Other configured systems that can physically move the plants from the sealed environment to a position outside of the structure and back again can be used.

The artificial light can be any suitable type of light that promotes *cannabis* plant growth. For example, the artificial light could include any one or more of a high-intensity discharge (HID) lamp, a light-emitting diode (LED), an induction fixture, a metal halide (MH), a ceramic metal halide (CMH), fluorescent light, an incandescent light, a halogen light, or combinations thereof. The artificial lights can be arranged to expose the plants to the artificial light in any suitable configuration. For example, the artificial lights could be attached in any manner to a ceiling and/or any wall or other surface of the ambient environment. More specifically, in the building example, the lights could be attached to the ceiling of the ambient environment in a grid configuration and positioned to best expose the plants to the artificial lights. The artificial lights can be movable with respect to the plants, in some examples. The moveable artificial lights could be movable based on plant height and position, which is discussed more below. Alternatively, the plants can be moved relative to stationary artificial lights to achieve the calculated optimum light exposure.

The disclosed systems and methods of *cannabis* growth are next discussed in the example in which they are positioned in a building or other structure. Various environmental control systems are included in the growth systems and methods. The control systems interact with respective sensors. As discussed above, the sensors sense an environmental element and send the sensed data to a controller. Any suitable sensors can be used. The controller determines whether the sensed value is in a range of values or meets a threshold value that is an acceptable value or ideal value for growing *cannabis*. If the controller determines that the sensed values are acceptable, the controller may or may not send a signal that includes such data to the various control systems. If the controller determines that the sensed values are not acceptable, however, the controller can send a signal to one or more control systems to adjust one or more environmental elements and/or can prompt for user input. The data message sent by the controller can include information relating to the sensed value, the manner in which the adjustment should happen, the amount the environmental element should be adjusted and/or other information. The signal sent by the controller with the adjustment information can go to multiple control systems or to a single control system, as necessary.

Figure 3:
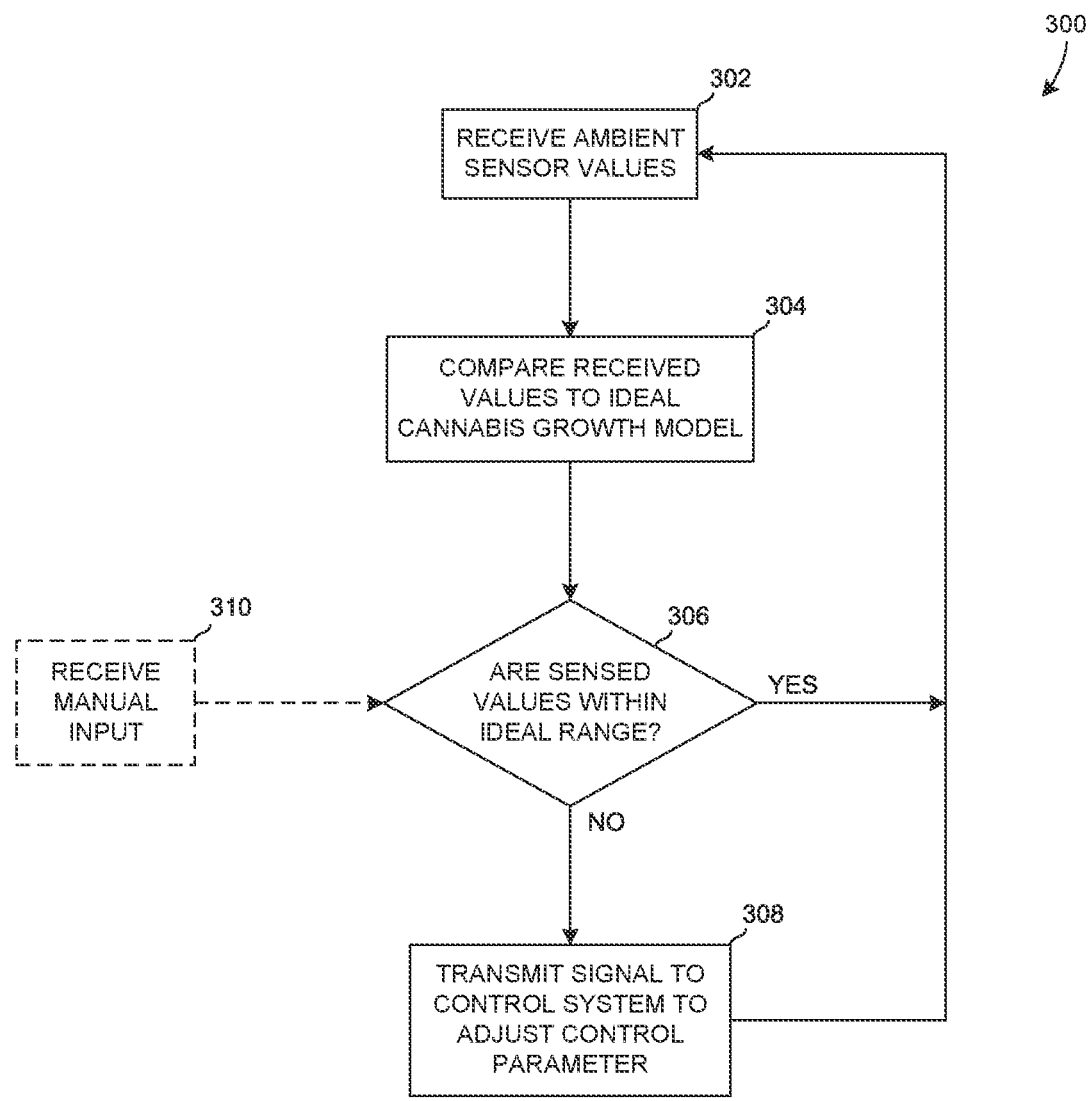
FIG. 3 is an example light control system method according to an embodiment of the invention.

FIG. 3 is an example control system adjustment method 300 according to an embodiment of the invention. Ambient sensor values are received 302, the received sensor values are then compared to an ideal *cannabis* growth model 304. A determination is made whether the sensed values are within an ideal range or tolerance 306 of the ideal *cannabis* growth model. Values for the ideal *cannabis* growth model can include ideal values for light exposure, light spectrum exposure, hydration, temperature and other ideal ambient environmental values and/or ranges. The values of the ideal *cannabis* growth model can be values stored in a database or other dynamic growth model values, including historic growth data, growth data correlated to ambient environmental conditions and other associated growth data.

For example, the ideal values for *cannabis* growth can be based on known, historic ideal values for growing *cannabis* in an ideal environment. Historic ideal values can be values that are generally known and have been researched or tried and known to work well for *cannabis* growth in other ambient environments. In another example, the ideal values for *cannabis* growth can be based on user input or on a dynamic compilation in the specific ambient environment in which the plants are actually growing and may be supplemented with manual user or employee input. User input can be a user entering values based on observation of the *cannabis* plants during the grow cycle or on other factors observed or otherwise known by a user. The ambient environment can be monitored and ideal values for environmental elements can be customized or adjusted based on previously sensed environmental data of the ambient environment. The dynamic compilation of environmental data can also be used in combination with the known ideal values for *cannabis* growth to determine the ideal values for one or more environmental elements. In some examples, historic ideal values can be combined with both user input values and compiled, dynamic values to obtain a high level of precision on the environmental elements for the *cannabis* plants.

Optionally, the decision can consider user or manual input 310 from growers, employees, or other observers or users that can influence the ultimate decision regarding the sensed value and future control system action that is required. If the sensed values are within an allowable tolerance, the system recycles and data is once again received from the ambient sensors 302. If it is determined the sensed ambient values are outside of a tolerable amount, the system can transmit a signal to one or more control systems to adjust a control parameter 308. The adjustment of a parameter corrects an ambient environment element back to a desired or ideal value. Once the system has transmitted the command 308, the system again samples the ambient sensor values to assess whether the correction has corrected the ambient environment element to an ideal or tolerable range or amount.

The environmental can be continuously monitored or values of the environmental elements can be sensed on-demand and/or on a predetermined scheduled. Some control systems could be continuously monitored while other control systems can be monitored on-demand and/or on the predetermined schedule. Any suitable monitoring and/or sensing schedule, continuous, scheduled, or on-demand, can be used and the monitoring and/or sensing schedule can be the same for each control system or can be different for one or more control systems.

For example, the sealed environment in the building can include any one or more of a control system for controlling the following or other ambient environment elements of the *cannabis* plants: light control system(s), climate control system(s), HVAC control(s), $CO_2$ level control(s), irrigation or water system(s), scent control system(s), pest/fungal/bacterial control system(s), video monitoring system(s), air flow control system(s), radio frequency identification (RFID) tracking system(s), asset tracking system(s), personnel tracking system(s), and humidity control system(s). Any of the control systems can be programmed to automatically adjust based on the received signal from the controller. Alternatively or additionally, the controller can send a signal with to one or more control system(s) that includes information on adjusting one or more environmental elements.

For example, a user/grower periodically performs a visual inspection of the plants and determines that an environmental element needs precise adjustment. The user/grower can input system information to cause the controller to send a signal to one or more control system(s) to adjust an environmental element in a desired way.

The $CO_2$ levels in the ambient environment can be controlled by introducing $CO_2$ burners or $CO_2$ tanks along with other types of $CO_2$ generation. $CO_2$ levels can be adjusted to optimum levels for *cannabis* growth based on any variety of factors including the natural $CO_2$ levels found in the region the plants are located and/or an optimal level that is considered ideal for *cannabis* plant growth. For example, the sealed system maintains a $CO_2$ level of approximately 1200-1400 parts per million (ppm). Generally, the average $CO_2$ level in a natural environment is around 330 ppm. The heightened levels of $CO_2$ act as a catalyst to facilitate the *cannabis* plants' hyper-metabolic state, which improves the quality and quantity of the production of the *cannabis* plants.

Further, example humidity control systems include dehumidifiers, dehumidifying functions on HVAC control systems, humidifiers and other known methods and systems of controlling humidity in a plant environment.

A scent control system can be included within the *cannabis* growth system. The scent control system can include a negative suction that is applied to the ambient environment, such as by positioning outtake fans to pull air away from the ambient environment. The outtake fans direct the vented air out from the ambient environment, thereby removing scent of the growing process from the ambient environment. Further scent control methods include charcoal filters that filter recirculated air. Other scent control methods and systems can be used to control scent within the *cannabis* growth system.

The disclosed *cannabis* growth systems can also include an emergency override system. In an example *cannabis* growth system, the emergency system is managed by an automatic thermal control and manual override. When the emergency override is required, the automatic thermal control regulates the temperature in the ambient environment and the manual override allows a user to interact with and adjust one or more control systems. An emergency air management system can replace the air in the facility rapidly with outside air in the event of an emergency, such as a fire, critical $CO_2$ event, or noxious atmosphere. The emergency air management system can use, but is not limited to, high volume fans.

The emergency systems can include an operable emergency override. As discussed above, once triggered, the emergency system can trigger other, companion control systems in an example emergency situation. A green light can be illuminated to guide people around the facility during an emergency situation. Green guide lights can further be used during normal operations, as green light is not absorbed by *cannabis* plants and is thus useful to provide lighting in an otherwise dark facility. The green light does not adversely affect the plants during the light deprivation period of the grow cycle.

The disclosed *cannabis* growth systems and methods can also include systems like a video surveillance system, a security system, an asset tracking system, a personnel tracking system, or other monitoring system designed to protect the facility in which the plants are located. The disclosed systems and methods can also include an identification system that verifies the identity of a person trying to enter the facility and/or requires a code or other access mechanism to provide a security system for controlling access to or otherwise protecting the plants. The security systems can be configured to automatically call law enforcement or fire department agencies if the system detects an emergency or security situation.

An asset tracking system is one that keeps inventory of *cannabis* plants, grow equipment, and other valuable assets like customer lists and other confidential business materials. A personnel tracking system monitors the people interacting with or otherwise gaining access to the ambient environment in which the *cannabis* plants are growing. The personnel tracking system can monitor which people enter the ambient environment, the length of that person's stay in the ambient environment, and any changes or input the person made to the system while in the ambient environment. The personnel tracking system can monitor any aspect of the activities of the people having access to the ambient environment of the *cannabis* plants.

In some examples, a tracking device, such as an RFID tag, can be attached to the assets and the personnel interacting with the plants to monitor and track the location and activities associated with both the assets and the personnel. For example, RFID tags are attached to the *cannabis* plants and to moveable equipment in the ambient environment. Personnel having access to the *cannabis* plants and equipment are required to wear a badge or other tracking element that also includes an RFID tag. RFID readers are strategically positioned around the ambient environment, including at the points of entry/exit to monitor both the movement of the plants and equipment and the personnel entering and exiting the ambient environment of the plants. Any suitable asset and personnel tracking system can be used including restricted access with personnel codes, security locks, and other identifiers that increase the security of the ambient environment and monitor the activities and locations of the assets and personnel.

An alarm system can also be included with the *cannabis* growth systems and methods. The alarm system can be a versatile system that monitors the grow facility for both emergency and security situations. The alarm system can also trigger a selected message or audible alarm when a particular situation is detected. For example, the message could be an electronic mail (email) that is sent to one or more people when a particular event occurs, such as an emergency event, as discussed above, and/or when a particular environmental element is outside of its acceptable range. In a more specific example, if the temperature of the ambient environment is nearing or exceeds a critical threshold that is known to cause damage to the plants, one or more people may be notified by phone, email or any other type of communications or messaging systems.

Further, when an environmental element nears or reaches a critical threshold, or another value or range that triggers an emergency situation for either or both of the plant growth and the plant security, the controller can be configured to send a signal to one or more control systems to take a preservation action, such as shutting down or increasing significantly one or more control systems. The controller can also be configured to prioritize one or more of the control systems, into one or more priority groups, as explained further below.

In an example, the power might fail at the facility at which the *cannabis* plants are growing and leaves the plants' ambient environment uncontrolled and its control systems un- or under-powered. Parallel and/or emergency power systems, such as generators, and uninterruptible power supply (UPS) systems can power selected core systems to preserve the plants and/or can trigger an alarm and/or send messages to one or more people. The core systems can include lighting, irrigation, HVAC, security or anything else that is critical to preserving the plants.

Further, the system can prioritize ambient environment control systems, such as the core systems, based on the sensed conditions, available power and other variables to preserve the plants as much as possible in an ideal or most favorable growing conditions. Less critical controls systems, like video surveillance or scent control, for example, might be considered less critical control systems and can remain in a powered off condition while the selected core *cannabis* growth methods and systems are powered by an alternative source. Prioritizing the control systems can happen in multiple levels and each control system can be assigned a priority level. The control system with the highest priority level is the control system most critical to preserving the *cannabis* plants in the event of an emergency, like a power failure, a fire, or the like.

The prioritization of the control systems can be different depending on the type of emergency or urgent event. For example, when the power fails, a back-up generator powers on to provide power to critical, core control systems such as HVAC, lighting, and irrigation until the main power supply can be restored. The prioritized controls systems are the HVAC, lighting, and irrigation and all other control systems are powered off and do not receive power from the back-up generator. The controller determines the priority of these control systems and allocates power according to the prioritization.

In another example of a fire or other security emergency, environmental control systems, such as video surveillance and fire suppression or other security assistance systems are given a first level of priority. The control systems that are critical to preserve the growth of the *cannabis* plants are given a second level of priority and all remaining control systems, such as the scent control system and the humidity control system are given a third level of priority. Typically, such emergencies have a relatively short duration and emergency assistance or law enforcement arrives at the location of the ambient environment of the *cannabis* plants before the plants would likely suffer from environmental conditions. Once the fire or other security emergency has been resolved, power is restored to all of the environmental control systems and the priority levels assigned to each control systems no longer apply.

Any of the above control systems can be permanently installed in a grow facility. Alternatively, any one or more of the above control systems can also be selectively removable from the facility. Such a configuration gives the users/growers the ability to easily transport the selectively removable control systems from facility to facility, in a "plug-and-play" fashion. This configuration further allows a user or grower to install the system in facilities on an on-demand, or as necessary, basis depending on the current growth cycle of the *cannabis* plants within the facility. Because of the portable nature of the selectively removable control systems, *cannabis* growth facilities can be assembled and disassembled easily and without intense build-out labor and investment.

Figure 4:
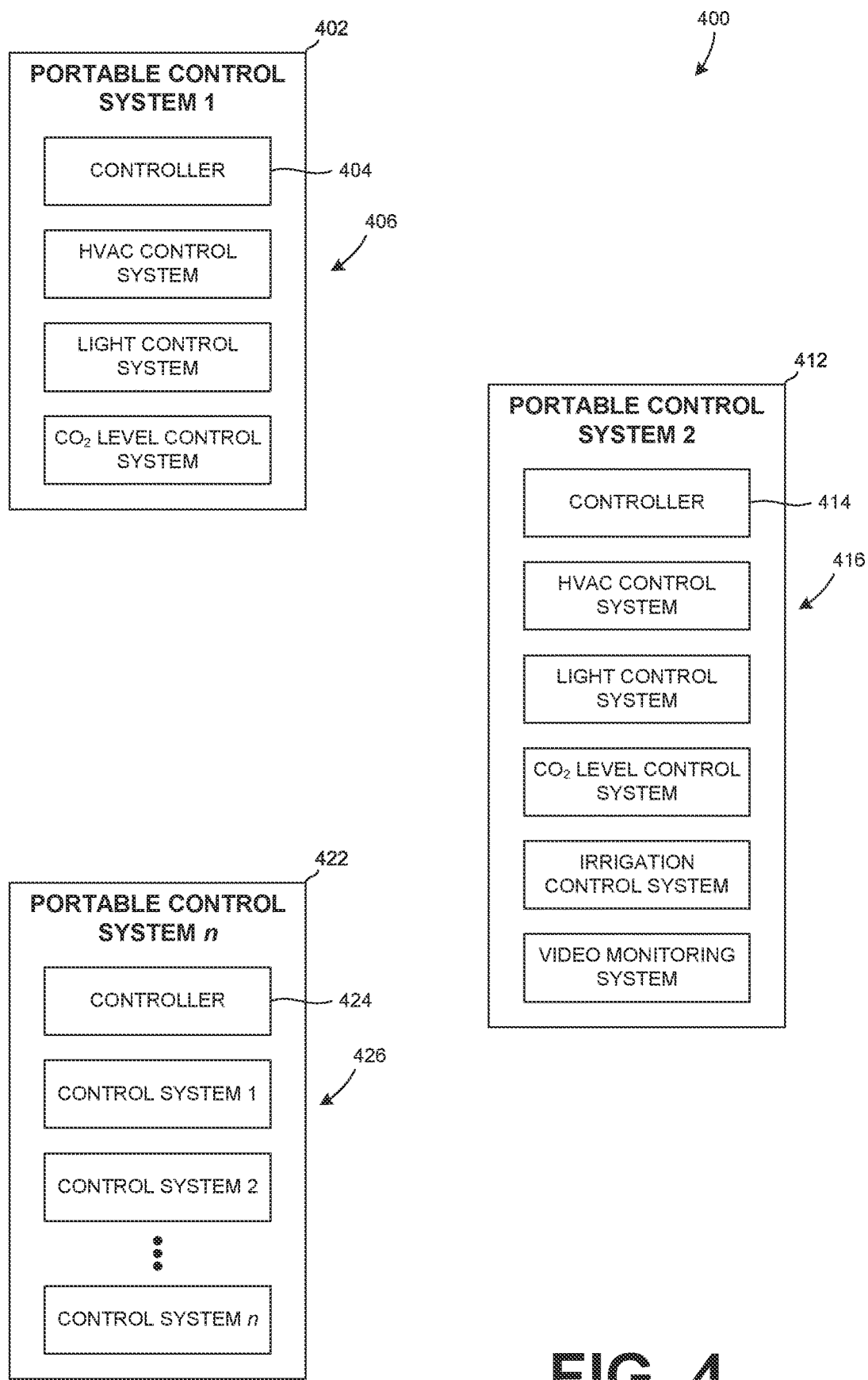
FIG. 4 is an example modular cannabis growth system according to an embodiment of the invention.

FIG. 4 illustrates a modular *cannabis* growth system 400 which includes a first portable control system 402, a second portable control system 412 and an n portable control system 422. Each control system, 402, 412 and 422, include a controller, 404, 414 and 424, that controls the various included control systems, 406, 4126 and 426, respectively. This arrangement allows each of the portable control systems to be independent as each system includes a controller that controls the various connected control systems and monitors associated ambient environmental elements. Additionally, the portable control systems can be interconnected if desired with the individual controllers acting as a slave to a selected master controller. Alternatively, the interconnected controllers can operate in a distributed computing manner with the various controllers sharing the controlling duties in an organized or hierarchal manner.

Some of the portable control systems can be grouped together in a control systems kit. For example, one kit might include a portable HVAC system with a portable lighting system, and $CO_2$ control system. A second kit could include all of the control systems of the first kit along with additional control systems like irrigation, air flow, video monitoring, etc. Even more sophisticated control systems could be included in a kit. Generally, the kits also include the main controller that links and controls each control system in the kit. The controller is pre-programmed, in some examples, to control the control systems to provide an ideal or near ideal ambient environment for the *cannabis* plants to grow well. Some pre-programmed controllers may also allow for some, limited end-user programming as well.

The portable kits can be used by small operators and/or operations needing to become operational quickly and other interested users. The kit includes a hard-use controller that includes a full electrical system specifically designed for growing *cannabis* indoors. As discussed above, the kits can come in a variety of forms, including a basic system and advanced system arrangement. All portable systems have complete facility control of the plants' ambient environment described herein. For example, the basic system can include a controller with controls for an HVAC system, or for an even more basic air conditioning (AC) unit. The advanced system can include the HVAC system, security system, fire alarm and/or fire suppression systems, and any other additional controls.

The kits interface with a remote control facility that programs and controls the various ambient environment control systems. The remote control facility further manages all aspects of the control systems in the kits, from providing real time control and feedback of sensed environmental elements to adjusting temperatures and other environmental elements. Real time in this sense means that the sensed data is sent to the controller instantaneously or near instantaneously so that the control has a live or near live set of data for each of the environmental elements of the ambient environment. The real time control can include a set schedule according to a clock, such as an atomic clock, or a response to a triggering event like a manual override or a sensed environmental value that is outside the acceptable range of values. Any time a triggering event occurs, or any other action is taken, in the facilities with the kits, the remote control facility can optionally notify one or more people via any type of communication method, including electronic messaging formats, such as email, text message or voice alert.

A grower or other user can select a specific growth process for the *cannabis* plants based on a number of considerations, such as the type of *cannabis* plant, the desired characteristics of the *cannabis* plant, rejuvenating sick *cannabis* plant, and/or the age of the *cannabis* plant. The selected growth process maximizes the quantity of flowering of the *cannabis* plants and maintains the highest possible production of the desired cannabinoids within the *cannabis* plants irrespective of the amount of final product that may be cultivated from the *cannabis* plants. The selected growth process can influence the manner in which the controller, described above, is programmed. For example, the controller can include several control systems and a particular selected growth process that requires adjustment of specific control systems in order to maintain the specific ranges of temperatures, humidity, $CO_2$ levels, soil conditions, light, light deprivation, air flow, etc., required for the selected growth process. The controller is programmed to the ambient environment requirements of the selected growth process. The programming of the controller, in any example, can be customized to the selected growth process, and optionally configured to be further programmed by the end-user. The controller can have multiple programming functions.

For example, the controller can be programmed to control plants in a vegetation ("veg") cycle of the growth process with a veg cycle program and can also be programmed to control plants in a flowering cycle of the growth process with a flowering cycle program. The plants in the veg cycle can be physically located in a different location within the facility than the plants in the flowering cycle with the controller able to separately control the ambient environment in both locations. Any suitable number of separate areas within a grow facility can be included and separately controlled by the controller.

As discussed above, the controller of the disclosed *cannabis* growth systems and methods can also have one or more dedicated electrical connections that are each connected to one or more respective control systems. Each of the dedicated electrical connections can control one or more control systems. In some examples, the controller is a distributed control system that is a central computing system of the *cannabis* plant grow facility. The distributed control system monitors, controls, and adjusts aspects of the grow facility. As discussed above, the controller, or the distributed control system, can manage multiple control systems. Each respective control system is programmed by a user, such as a grower, process expert, or facility engineer. Each of the control systems at the facility communicates with the distributed control system to perform tasks, such as employee activity (employment tracking, procedure compliance, safety and security compliance, cleaning duties, moving plants, caring or otherwise maintaining the plants, weighing the plants, etc.).

Figure 5:
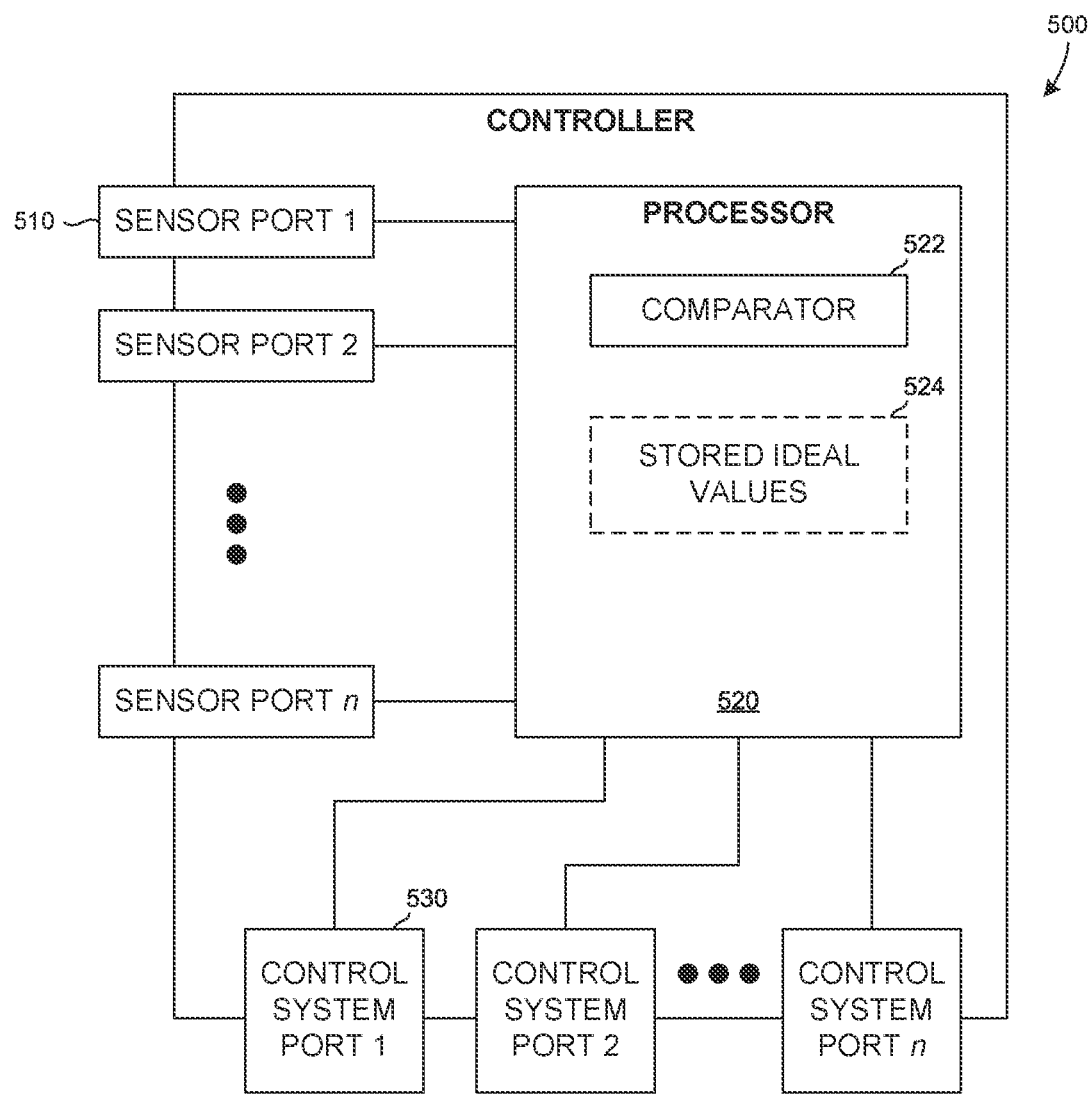
FIG. 5 is an example cannabis growth system controller according to an embodiment of the invention.

An example controller 500 is shown in FIG. 5. The controller 500 includes a sensor port 510, a processor 520 and a control system port 530. Ambient environmental sensors are connected to the plurality of sensor ports 510. The sensor ports communicate with the sensor data received by a processor 520 that includes a comparator 522. The comparator 522 compares the received sensor values to a set of stored ideal values or ranges 524. The stored ideal values and ranges 524 can be included on the processor 520 or can be stored elsewhere and communicated to the processor 520. The processor 520 outputs commands to various control systems, transmitting the commands through the control system ports 530 to which the various control systems are in communication.

The user tasks can be entered by a user or they can be automatically generated according to the progress of the tasks that are tracked by the system. For example, multiple user stations are strategically positioned in the grow facility to promote the employees to enter data about the plants or the tasks performed by the users in near real-time. The near real-time data entry by the employees improves the quality of the overall operational status of the facility and the condition of the plants because a human user, the employee, with subjective reasoning is supplementing the data generated by the automated system to compile the operational status and the plant condition. The user tasks can be combined with the sensed data from the ambient environment to determine the operational status of the facility and the condition of the *cannabis* plants within the facility.

The distributed control systems or supervisor control and data acquisition systems are typically connected to and in communication with multiple systems coupled to it for centralized and coordinated control. For example, the distributed control system controls the height of the lighting overall the plants, lighting timing, $CO_2$ levels, HVAC control, irrigation control, emergency power, asset and personnel tracking, security, error codes, and fire alarm/suppression systems.

In the distributed control systems, the lighting height can be automatically adjusted by raising and lowering light grids controlled by motors located on the ceiling over the *cannabis* plants. Data input methods for the lighting height control include, but are not limited to, four redundant height scanning lasers with the highest set point setting being set to the ceiling height. The distributed control system is programmed to set lighting height points that slowly attenuate the ceiling to the ideal height for maximum *cannabis* plant production. In some examples, ceiling light grids or platforms are only mobile during the 12-hour light exposure phase, and more specifically during the artificial light exposure in a hybrid light exposure approach, during which the lights are powered on.

The distributed control systems can also include lighting timers having communications panels with atomic clocks to maintain consistent timing throughout all systems controlled by the distributed control systems. Lighting generally powers on according to a programmed schedule and any deviations from the programmed schedule trigger a message sent to one or more users or an alarm or other alert. For example, a quadrant of lighting in a facility fails to turn on at its specified time due to a component failure. When the lights fail to turn on, the distributed control system receives the data of the light failure and sends a notification to the relevant or pre-selected parties.

The distributed control systems also include a $CO_2$ control, an HVAC system, an irrigation control system, an emergency power system, an error code system, an asset and personnel tracking system, and a fire alarm/fire suppression system. The $CO_2$ control and HVAC systems are similar in function and connection/control by the distributed control system to those respective systems discussed above. As discussed above, each respective system has one or more corresponding sensors. For example, the $CO_2$ control system has four $CO_2$ sensors in a particular area of the grow facility. The four $CO_2$ sensors provide redundant input for the sensed $CO_2$ levels. $CO_2$ burners can be controlled by the $CO_2$ control system to increase the $CO_2$ levels within the facility to reach a desired, or ideal, level. The fire box encased $CO_2$ burners and natural gas feeds having shut-off valves are connected to the fire alarm system as well as the distributed control system.

The HVAC control systems in the distributed control systems can include one or more thermostats, air handlers, UV lights and backdraft dampeners that each follow a program implemented by the distributed control system. The HVAC system also has an emergency heat management program that begins with an emergency heat triggering event like a complete HVAC cooling failure. If such an emergency triggering event occurs, the distributed control system shuts down the lighting, quadrant by quadrant of the ambient environment in some cases, to reduce the heat in the ambient environment of the plants as much as possible to reduce the risk of catastrophic heat damage to the plants. As with other triggering event, an alarm, alert, and/or message can be sent in response to the HVAC emergency.

The distributed control system also includes an irrigation control, which is one of the more critical systems in the cannabis growth process. The grow facilities have primary water holding tanks that can include high pressure pumps to facilitate the flood-drip watering process. A moisture or water sensor can sense when the plants need water and how much water is needed. The sensors can also sense an emergency situation, like a fire, during which the irrigation system can be diverted to the fire suppression system to assist in extinguishing the fire.

The fire alarm/fire suppression system is also connected to and controlled by the distributed control system. The fire and smoke detectors are strategically placed within the grow facility. When one of the detectors detects fire and/or smoke, it triggers an alarm. The alarm can include an audible alert, a flashing light, and/or notifying the local fire department. The detection of the fire and/or smoke also trigger a communication, like an email or text message, to one or more users. In response to the detection of fire and/or smoke, the distributed control system can also activate sprinklers or other fire suppression systems, shut down the lighting, turn off the natural gas supply and other actions to assist with fire suppression.

The distributed control system can control an emergency power system, which is described above. The grow facility includes one or more power sensors. In the event of a power failure, the distributed control system implements its power failure programming. The power failure program maintains core systems with an emergency power source, in some examples. The power failure program is configured to apply the emergency power supply, if one exists, and to shut down selected non-critical control systems. As with most control systems in the distributed controls system, a message or communication might be triggered or some kind of alarm might be activated.

The power failure program can include decision making and adaptive control of the various facility control systems. In this example, the power failure program can assess the available amount of power and the sensed ambient environment elements. The program can then assess which control systems are most critical to maintain the plants in the ideal or near ideal, or a most favorable condition possible given the reduced available resources.

For any of the embodiments discussed above, the controller or the distributed control system can generate an error code. An error code identifies and/or describes any system failure, deficient performance of the control system, maintenance performed, routine monitoring or the like. The error code can identify and describe any information about the control systems that is abnormal from the predetermined growth process. The error code can be stored for system review or it can give information to the user or other person fixing the triggering event that caused the error code.

Having described and illustrated the principles of the invention in the embodiments thereof it should be apparent that the invention can be modified in arrangement and detail without departing from such principles. We claim all modifications and variations coming within the spirit and scope of the invention. The foregoing description is only exemplary of the principles of the invention. Many modifications and variations of the present invention are possible in light of the above teachings. The embodiments of this invention have been disclosed, however, so that one of ordinary skill in the art will recognize that certain modifications and variations would come within the scope of this invention.

The invention claimed is:

1. A cannabis growth system, comprising:
a controller configured to:
receive a sensed value from one of multiple environmental sensors, each of the environmental sensors configured to sense respective environmental elements controlled by respective environmental control systems in an ambient environment of one or more cannabis plants each associated with a respective plant strain;
compare the sensed value to one or more of a known historical, compiled, or ideal value or a range of values associated with the sensed respective environmental element, the ideal value or the range of values associated with an ambient environment that promotes cannabis plant growth for each of the respective strains of the one or more cannabis plants;
generate a data message that includes one or both of instructions for adjusting or generating an alert about the respective environmental control system based at least in part on the comparison of the sensed value to the known historical, compiled, or ideal value or range of values associated with the sensed respective environmental element;
prioritize the multiple environmental sensors based on one or both of the received sensed value and the comparison of the sensed value to the known historical, compiled, or ideal value or the range of values;
prioritize the multiple environmental sensors into a first priority group associated with critical environmental control systems and a second priority group associated with non-critical environmental control systems; and
send data instructions to the second priority group to power off the associated non-critical environmental control systems; and
multiple dedicated electrical connections each electrically coupled to the respective environmental control systems and, if an instruction for any one or more of the respective environmental control systems is generated, the controller is further configured to transmit the generated data message to the one or more respective environmental control systems.

2. The cannabis growth system of claim 1, wherein the environmental control systems include at least one of a climate control system, a ventilation and temperature control system, a CO2 control system, a temperature control system, a humidity control system, a lighting control system, a water monitoring system, an air filtration system, a scent control system, an irrigation system, and a manual control system.

3. The cannabis growth system of claim 1, wherein the sensed value is received from a lighting sensor, and wherein the determined instructions include a hybrid light exposure for the one or more cannabis plants, the hybrid light exposure including exposing the one or more cannabis plants to a combination of natural light and artificial light during a light exposure period during the growth cycle of the one or more cannabis plants.

4. The *cannabis* growth system of claim 1, wherein the ambient environment is a fully-sealed, indoor environment.

5. The *cannabis* growth system of claim 1, wherein the multiple dedicated electrical connections are physically attached to the controller.

6. The *cannabis* growth system of claim 1, wherein the sensed value is received in real-time or near real-time to the sensed value being sensed by the respective environmental sensor.

7. The *cannabis* growth system of claim 1, wherein the value or range of values includes at least one of known historic ideal values of ideal *cannabis* growth and compiled dynamic values of the ambient environment.

8. The *cannabis* growth system of claim 1, wherein the controller is further configured to generate instructions for adjusting the one or more respective environmental control system based on at least one of user input and historic *cannabis* growth conditions for the one or more of the *cannabis* plants.

9. The *cannabis* growth system of claim 1, wherein the controller is configured to:
receive multiple sensed values from multiple respective environmental sensors configured to sense respective environmental elements each controlled by respective environmental control systems in the ambient environment;
compare the multiple received sensed values to multiple respective known historical, compiled, or ideal values or a range of values associated with the one or more *cannabis* plants, each associated with the respective plant strain;
generate a data message with the instructions for adjusting or outputting an alert about the respective environmental control systems based at least in part on the comparison of the sensed values to the values or the ranges of values associated with the sensed respective environmental elements; and
if the data message that includes instructions to adjust one or more of the respective environmental control systems, transmit the instructions to adjust the one or more respective environmental control systems.

10. The *cannabis* growth system of claim 1, wherein the controller is further configured to generate an alert in response to at least one of receiving the sensed value, comparing the sensed value to the known historical, compiled, or ideal value or the range of values, and generating the data message that includes the instructions for adjusting the respective environmental control system.

11. A *cannabis* growth system, comprising:
multiple sensors positioned within an indoor ambient environment of multiple *cannabis* plants, each of the plants having a plant strain, each of the multiple environmental sensors configured to sense respective environmental elements either in the indoor ambient environment or outside of the indoor ambient environment;
multiple environmental control systems each configured to control the respective environmental elements in the indoor ambient environment of the *cannabis* plants;
a controller having multiple dedicated electrical connections that are each electrically coupled to the respective environmental control systems, the controller configured to:
receive sensed values from the multiple environmental sensors;
compare the sensed values to respective known historical, compiled, or ideal values or ranges of values associated with each of the sensed respective environmental elements, the historical known, compiled, or ideal values or ranges of values associated with promoting *cannabis* plant growth for each of the plant strains;
generate a data message with instructions for adjusting or outputting an alert about the one or more of the respective environmental control systems based at least in part on the comparison of the sensed values to the known historical, compiled, or ideal values or the ranges of values associated with the sensed respective environmental elements;
prioritize the multiple environmental sensors based on one or both of the received sensed values and the comparison of the sensed values to the ideal values or ranges of ideal values;
prioritize the multiple environmental sensors into a first priority group associated with critical environmental control systems and a second priority group associated with non-critical environmental control systems;
send data instructions to the second priority group to power off the associated non-critical environmental controls systems; and
if the instruction is generated to adjust the one or more of the respective environmental control systems, transmit the data message that includes the instructions for adjusting the one or more of the respective environmental control systems, the data message configured to be sent to the one or more respective environmental control systems determined to need adjustment through the respective dedicated electrical connections for the one or more respective environmental control systems.

12. The *cannabis* growth system of claim 11, wherein the ambient environment is a fully-sealed, indoor environment.

13. The *cannabis* growth system of claim 11, wherein the multiple dedicated electrical connections are physically attached to the controller.

14. The *cannabis* growth system of claim 11, wherein the sensed values are received in real-time or near real-time to the sensed values being sensed by the respective environmental sensors.

15. The *cannabis* growth system of claim 11, wherein at least one of the sensed values is received from a lighting sensor, and wherein the determined instructions include a hybrid light exposure for the multiple *cannabis* plants, the hybrid light exposure including exposing the multiple *cannabis* plants to a combination of natural light and artificial light during a light exposure period during the growth cycle of the multiple *cannabis* plants.

16. The *cannabis* growth system of claim 11, wherein the controller is further configured to determine the instructions for adjusting or outputting an alert about the respective one or more environmental control systems based on at least one of user input and historic *cannabis* growth conditions for the multiple *cannabis* plants.

17. The *cannabis* growth system of claim 11, wherein the controller is further configured to generate an alert in response to at least one of receiving the sensed values, comparing the sensed values to the ideal values or the ranges of ideal values, and generating the data message that includes the instructions for adjusting the respective environmental control systems.

* * * * *